(12) United States Patent
Yakimenko et al.

(10) Patent No.: US 11,667,407 B2
(45) Date of Patent: Jun. 6, 2023

(54) SYSTEM AND METHOD FOR AUTOMATED INTERCEPT AVOIDANCE FOR SPACECRAFT

(71) Applicant: THE UNITED STATES OF AMERICA, AS REPRESENTED BY THE SECRETARY OF THE NAVY, Arlington, VA (US)

(72) Inventors: Oleg Yakimenko, Seaside, CA (US); Edward Hanlon, Mt. Pleasant, SC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 483 days.

(21) Appl. No.: 16/855,205

(22) Filed: Apr. 22, 2020

(65) Prior Publication Data
US 2020/0354089 A1    Nov. 12, 2020

Related U.S. Application Data

(60) Provisional application No. 62/846,212, filed on May 10, 2019.

(51) Int. Cl.
| | |
|---|---|
| *B64G 1/52* | (2006.01) |
| *B64G 1/24* | (2006.01) |
| *B64G 1/36* | (2006.01) |
| *G06F 17/13* | (2006.01) |
| *B64G 1/10* | (2006.01) |

(52) U.S. Cl.
CPC ............... *B64G 1/52* (2013.01); *B64G 1/10* (2013.01); *B64G 1/242* (2013.01); *B64G 1/36* (2013.01); *G06F 17/13* (2013.01)

(58) Field of Classification Search
CPC . B64G 1/52; B64G 1/242; B64G 1/36; B64G 1/26; G06F 17/13
See application file for complete search history.

(56) References Cited

U.S. PATENT DOCUMENTS

| | | | | |
|---|---|---|---|---|
| 6,726,153 B1 * | 4/2004 | Campbell | .............. | B64G 1/407 244/172.6 |
| 2013/0292517 A1 * | 11/2013 | Briskman | ................ | B64G 1/10 244/158.8 |

(Continued)

OTHER PUBLICATIONS

Earth-Crossing Asteroid Intercept Mission with a Solar Sail Spacecraft Xiangyuan Zeng, Shengping Gong, Junfeng Li Tsinghua University, Beijing, Oct. 2014 (Year: 2014).*

(Continued)

*Primary Examiner* — Donald J Wallace
*Assistant Examiner* — Jalal C Coduroglu
(74) *Attorney, Agent, or Firm* — Naval Postgraduate School; Scott Bell

(57) ABSTRACT

Embodiments in accordance with the invention address potential co-orbital threats to a spacecraft through the use of a plurality of evasion pattern maneuvers selected to prevent a rendezvous with a potential co-orbital threat from occurring within a finite horizon. Embodiments in accordance with the invention maintain separation from the potential co-orbital threat while minimizing a defending spacecraft's fuel consumption.

6 Claims, 6 Drawing Sheets
(4 of 6 Drawing Sheet(s) Filed in Color)

(56) References Cited

U.S. PATENT DOCUMENTS

| | | | | |
|---|---|---|---|---|
| 2016/0347482 A1* | 12/2016 | Dimpfl | ................. | B64G 3/00 |
| 2018/0346153 A1* | 12/2018 | Kaplan | ................. | B64G 1/242 |
| 2019/0248516 A1* | 8/2019 | Kaplan | ................. | B64G 1/52 |
| 2020/0112378 A1* | 4/2020 | Holzheimer | ......... | H04B 10/691 |
| 2020/0354089 A1* | 11/2020 | Yakimenko | ............. | B64G 1/10 |
| 2021/0403183 A1* | 12/2021 | Weiss | ................. | B64G 1/242 |
| 2022/0227503 A1* | 7/2022 | Barnhart | ............... | G06N 3/006 |

OTHER PUBLICATIONS

Boyarko, George A., "Spacecraft Guidance Strategies for Proximity Maneuvering and Close Approach with a Tumbling Object," Naval Postgraduate School Thesis. Retrieved from the Internet: <URL: https://apps.dtic.mil/sti/pdfs/ADA518355.pdf>.

Hanlon, Edward A., "Design Strategies and Tactics to Defeat Co-Orbital Anti-Satellite Capabilities," Naval Postgraduate School Thesis. Retrieved from the Internet: <URL: https://apps.dtic.mil/sti/pdfs/AD1059897.pdf>.

Hanlon, N., and Yakimenko, O.A., "Introduction to Space Dogfighting—What Matters in Space Engagements," Proceedings of the IEEE Aerospace Conference, Big Sky, MT, Mar. 7-14, 2019.

\* cited by examiner

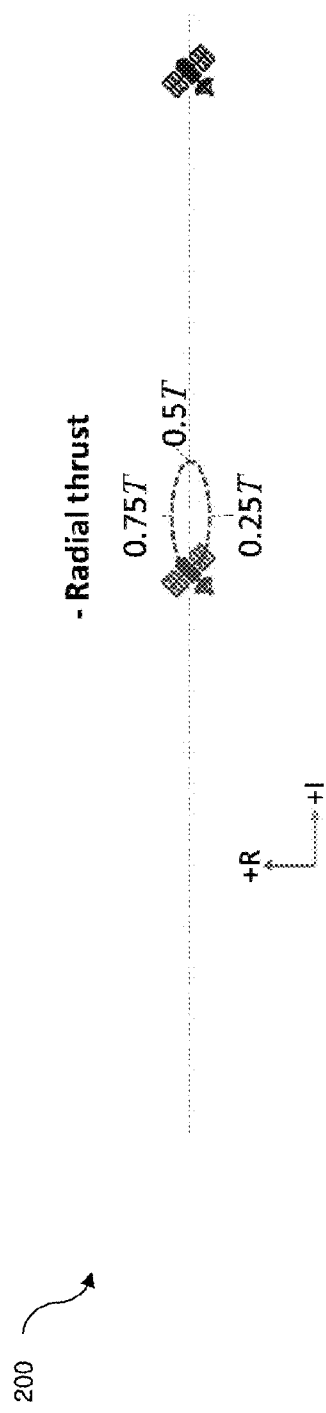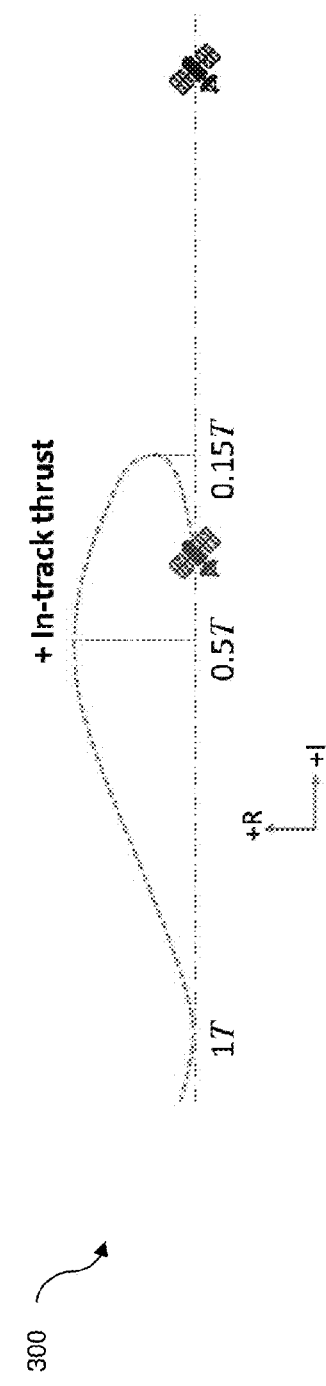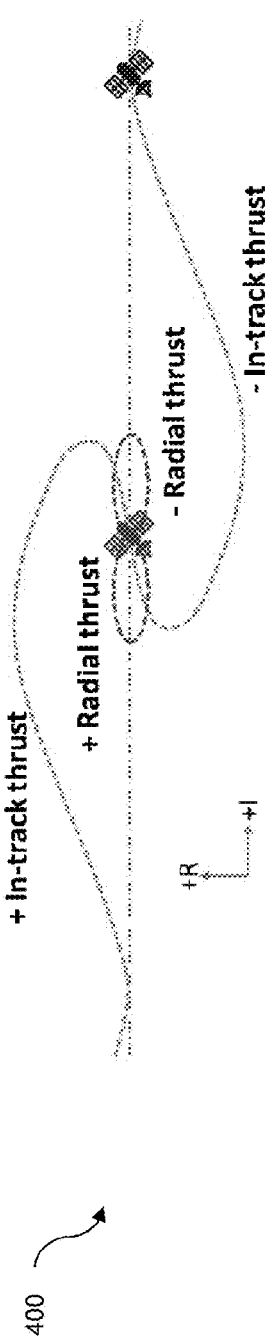

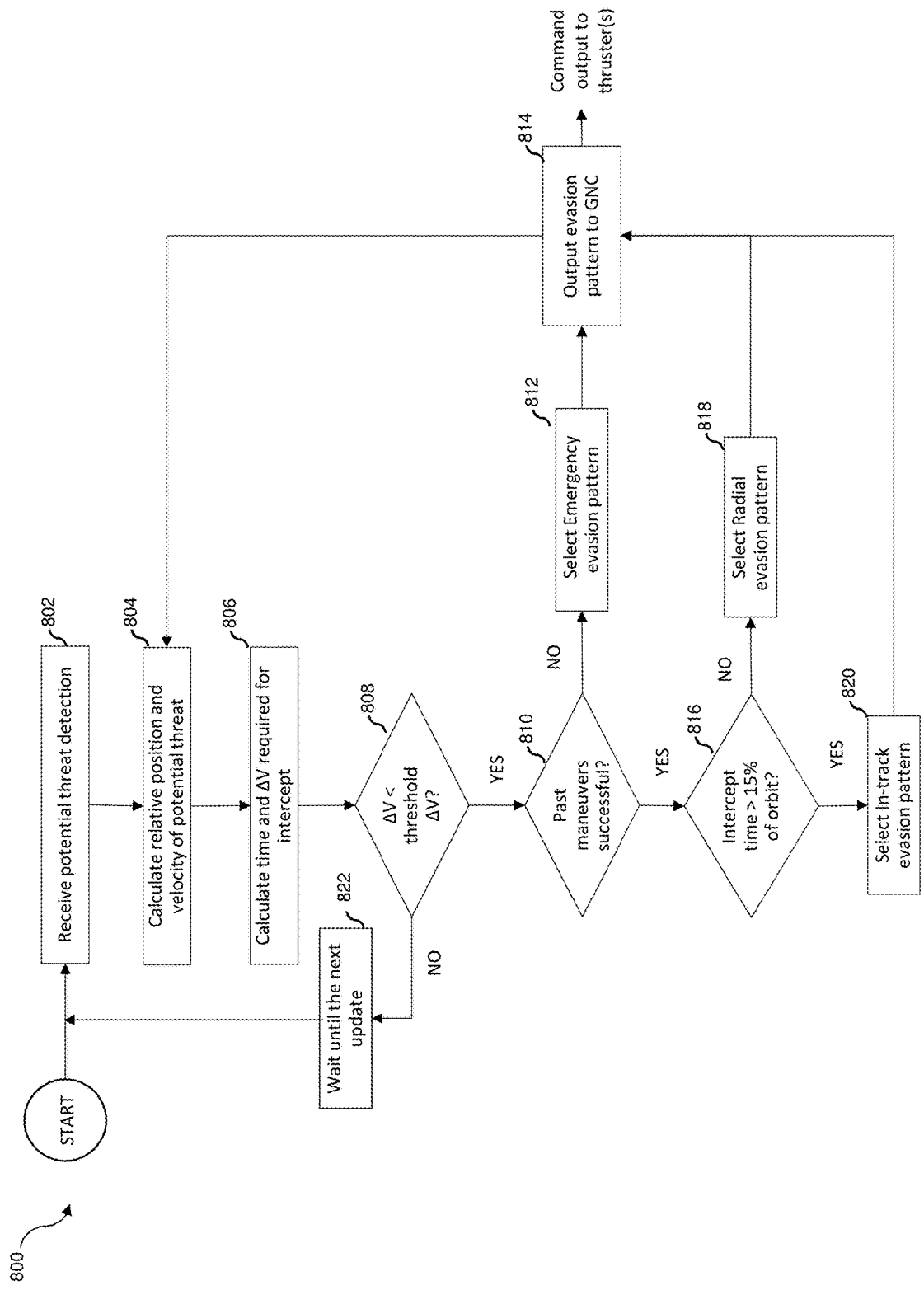

SYSTEM AND METHOD FOR AUTOMATED INTERCEPT AVOIDANCE FOR SPACECRAFT

CROSS-REFERENCE TO RELATED APPLICATIONS

This patent application is a non-provisional of and claims the benefit of U.S. Provisional application 62/846,212, filed May 10, 2019, which is hereby incorporated by reference in its entirety.

BACKGROUND OF THE INVENTION

1. Field of the Invention

The present invention relates generally to a system and method for automated intercept avoidance for spacecraft.

2. Description of the Related Art

Compared to vehicles operating in Earth's atmosphere, on the ground, or under water, satellites are quite vulnerable. In the battle to save weight and volume to reduce the launch costs, satellites are built with extremely fine tolerances. The only external forces they must withstand are the launch forces, but those are experienced in a controlled, stowed configuration. Once on-orbit, the spacecraft is only acted on by its own forces, and therefore structure can be minimized. With this minimization, and through the complexity of spaceflight, they frequently fail; not due to hostile action, but because of the space environment or design flaws. Thus, the process of interfering with a spacecraft's function could appear as an attractive option for an adversary.

As spacecraft are relatively fragile, a core principle is avoidance. As such, the point of origin of an attack is critical in determining an appropriate response. round-based weapons have limited windows of operation and are geographically fixed. They are easily attributable based on the region of origin. Cyber-physical weapons, that have no material form, can attack any layer of the satellite system from any attack vector. Co-orbital attacks originating on-orbit are not bound to a specific region and therefore are harder to attribute and avoid.

Co-orbital threats can take a variety of forms and have a variety of goals. However, to best take advantage of their location, they all aim to rendezvous or perform proximity operations with their targets. These are some of the most complex weapons systems as they are, effectively, not just weapons systems, but fully functioning satellites as well. Co-orbital attackers can strike multiple satellites in similar orbits, making them particularly well suited for the Geo-belt. They can perform close approaches to demonstrate that a target could be damaged, or that the target is under threat. They can also be used to examine the designs of targets to establish technical capability.

SUMMARY OF THE INVENTION

Embodiments in accordance with the invention utilize sensors, computer and limited-control-authority thrusters onboard a spacecraft for detecting and identifying potential coplanar-orbit threats followed by computing and conducting the best evasion maneuver to postpone or completely eliminate a possibility of an intercept/rendezvous event. Embodiments in accordance with the invention are best understood by reference to the following detailed description when read in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 illustrates the effect of applying a negative radial thrust.

FIG. 3 illustrates the effect of applying a positive in-track thrust.

FIG. 4 illustrates the effect of applying either negative or positive thrust in radial or in-track directions.

FIG. 8 is process flow diagram for a method 800 for automated intercept avoidance for spacecraft in accordance with one embodiment of the invention.

Embodiments in accordance with the invention are further described herein with reference to the drawings.

DETAILED DESCRIPTION OF THE INVENTION

Embodiments in accordance with the invention provide a system and method for automated intercept avoidance for spacecraft that utilize maneuver tactics as a means of avoiding a co-orbital threat to a spacecraft while minimizing the use of fuel by the spacecraft.

Orbital Mechanics—While a terrestrial maneuver is only based on velocity, to model orbital engagement, there needs to be a means of estimating a spacecraft's position over time while accounting for orbital mechanics and any maneuver. This is typically accomplished using a conventional geosynchronous orbit simulator, such as the STK Astrogator (available from Analytical Graphics, Inc., Exton, Pa.). A modified variant of a typical geosynchronous orbit simulator is used herein to describe the orbital engagements addressed by the embodiments of the invention. Further details of the model can be found in the Naval Postgraduate School thesis "Strategies and Tactics to Defeat Co-Orbital Anti-Satellite Capabilities," available at https://apps.dtic.mil/dtic/tr/fulltext/u2/1059897.pdf, and in "Introduction to Space Dogfighting—What Matters in Space Engagements" Hanlon, N., and Yakimenko, O. A., Proceedings of the IEEE Aerospace Conference, Big Sky, Mont., Mar. 7-14, 2019, each of which is hereby incorporated by reference in its entirety.

Figure 1:
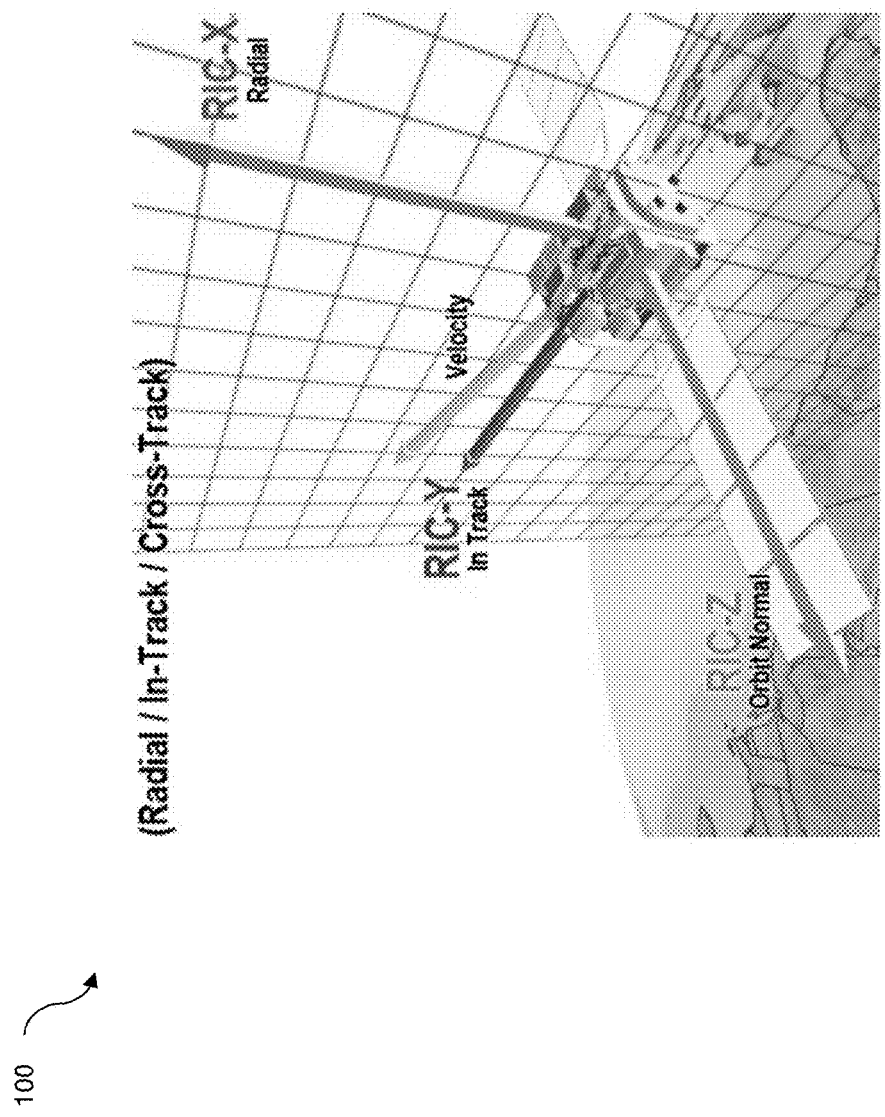
FIG. 1 illustrates an example of a spacecraft in a radial/in-track/cross-track (RIC) coordinate frame.

The model uses the radial/in-track/cross-track (RIC) frame, well suited for rendezvous because it defines positions relative to the object of interest. FIG. 1 illustrates an example of a spacecraft in a RIC coordinate frame. The radial component is outward along radial, perpendicular to the instantaneous velocity of the spacecraft, with positive values representing locations higher than the orbital altitude. The in-track component is along the velocity vector, with positive values representing locations ahead of the spacecraft. The cross-track component, completing aright-hand coordinate frame, represents positions to the left (positive) and right of the spacecraft, effectively the orbits with different inclinations.

Relative motion in orbit and the effects of thrust application—Objects with in-track separation are at the same orbital altitude, with the same velocity, and with the same inclination. These objects will, therefore, remain in this state in perpetuity unless an external force is applied.

An object initially positioned radially above the point of interest will not remain at that relative point. As the initial velocity matches the velocity of the point of interest, the object has the orbital velocity of a circular orbit below its own and therefore is actually in an ovular orbit with an apogee of its starting location and a perigee of the object of interest orbit. As the semi-major axis of the orbit is longer, the object has a longer orbital period and therefore travels slower in the in-track direction as well, causing the object to lag the point of interest.

An object positioned radially below the point of interest will have similar behavior, except it starts at perigee and climbs to an apogee at the orbital altitude of the point of interest. It travels faster in the in-track direction than the point of interest.

Objects initially positioned in the cross-track direction naturally oscillate between their starting location and its inverse, with a period equal to the orbital period. The objects maintain their in-track and radial positions, which means that any object directly positioned in a cross-track direction will impact the point of interest. These relationships continue to hold true when thrust is applied.

Thrust application effect is dependent on the direction the thrust is initially applied. Cross-track thrust is entirely decoupled from in-track and radial thrust. As such, when cross-track thrust is applied, the spacecraft only moves in the cross-track direction. From an inertial reference frame perspective, cross-track thrust creates an inclination change. The nodes of the newly inclined orbit are located at the point the thrust was applied at and the opposite side (50% period).

If there is any cross-track component to a position, it does not stay stationary but instead crosses the main orbit twice per orbital period. The spacecraft remains in a circular orbit despite the thrust applied; the only change is to the inclination. For the first 25% of the period, the spacecraft moves in the +C direction. At 25% of the orbit, the largest separation is reached, and the cross-track component begins to decrease. At 50%, the spacecraft reaches its second node and the cross-track component becomes negative. This process repeats indefinitely and is identical each time. There is no notable thrust effect. Radial and in-track movement are cross-coupled. That means that thrust in either radial or in-track directions results in radial and in-track movement.

Starting from a circular orbit, moving to a higher orbit (increasing radial position) as a result of a positive radial thrust results in a longer orbital period. This longer period is represented by negative in-track velocity in the RIC frame; effectively the spacecraft moves backwards from the reference point. Moving to a lower orbit (decreasing radial position) as a result of a negative radial trust results in a shorter period, which appears as a positive in-track velocity in the RIC frame. Hence, the radial thrust places the spacecraft in an elliptical orbit, with the first node at the starting point.

FIG. 2 visualizes the effect of applying negative radial thrust (downward thrust) to a spacecraft on-orbit. For the first 25% of the period, the spacecraft moves in the +I, −R direction. At 25% of the orbit, the spacecraft reaches the perigee of its orbit, which is also the location of highest +I velocity. As the spacecraft begins to ascend, the +I velocity lowers. At 50%, the spacecraft reaches its second node and begins to ascend. As a result, the in-track velocity becomes negative, and the spacecraft returns to its starting location. This process repeats indefinitely and is identical each time. Thrust in the positive radial direction creates the same effect, just reversed.

FIG. 3 shows the effect of applying positive in-track thrust (thrust to the right) to a spacecraft on-orbit. The thrust places the spacecraft in an elliptical orbit, with the perigee at the starting point. For the first 15% of the period, the spacecraft moves in the +I, +R direction. After this point, the higher orbital altitude results in a longer orbital period and thus a lower in-track velocity, which results in the spacecraft reversing direction to move in the −I direction. After 50% of the orbit, the spacecraft reaches the apogee of its orbit. The apogee is also the location of highest −I velocity. As the spacecraft begins to descend, the −I velocity lowers. After one period, the spacecraft begins ascending again, and the −I velocity increases again. This process repeats indefinitely. Note that the +I motion only occurs immediately following the thrust application—it does not repeat. Thrust in the negative in-track produces the opposite effect; the spacecraft loses orbital velocity and enters an elliptical orbit with an apogee at the point the trust was applied.

Thrust in the in-track direction produces a much larger overall displacement in both the radial and in-track direction. The increase in radial displacement is driven by the point thrust applied. In the radial thrust example, the spacecraft applies thrust at a node vice at perigee or apogee. Applying thrust at the node divides its effect into a decrease in perigee and an increase in apogee, which accounts for part of the displacement difference. The remainder is accounted for by the shape of the orbit. The orbit created using radial thrust is more circular compared to the orbit created by the in-track thrust, which results in lower extrema with the same average energy.

While both radial and in-track thrust firing produce the same net effect, changing orbit by firing in the radial direction is less efficient than by firing in the in-track direction. This situation is depicted in FIG. 4 and shows the effect of equal magnitude thrusts in the +/−in-track and +/−radial directions. While the radial and in-track components are not the same scale, all elements retain the same proportionality.

It is of note that the in-track thrust application moves initially in the direction the spacecraft applies thrust before reversing course after 15% of an orbital period. Depending on the timing of the event the spacecraft is trying to effect, it may be more efficient to use a different thrust direction.

Unlike terrestrial maneuvering, the level of effort measured in terms of a change in velocity $\Delta V$ required to maneuver between points in space is not directly dependent on the range between the points. Instead, the difficulty is cyclically time-dependent based on orbital dynamics. Depending on the starting positions relative to a common circular orbit, rendezvous may occur or be made easier due to natural orbital motion, or it may be complicated.

Ultimately, maneuvering to specific coordinates in space is dependent on the amount of time allocated to reach each point. As orbital dynamics govern all maneuvers, the ability to rendezvous is, in many cases, periodic. When evaluating an intercept maneuver, the two principal considerations are maneuver cost and time en route. The first consideration, maneuver cost, is normally fuel driven. Spacecraft must be launched with all of their fuel onboard; as of yet no effective refueling method exists. Given this constraint, mission life tends to be fuel limited. Any opportunity to reduce fuel consumption maximizes the spacecraft's operational life.

Figure 5:
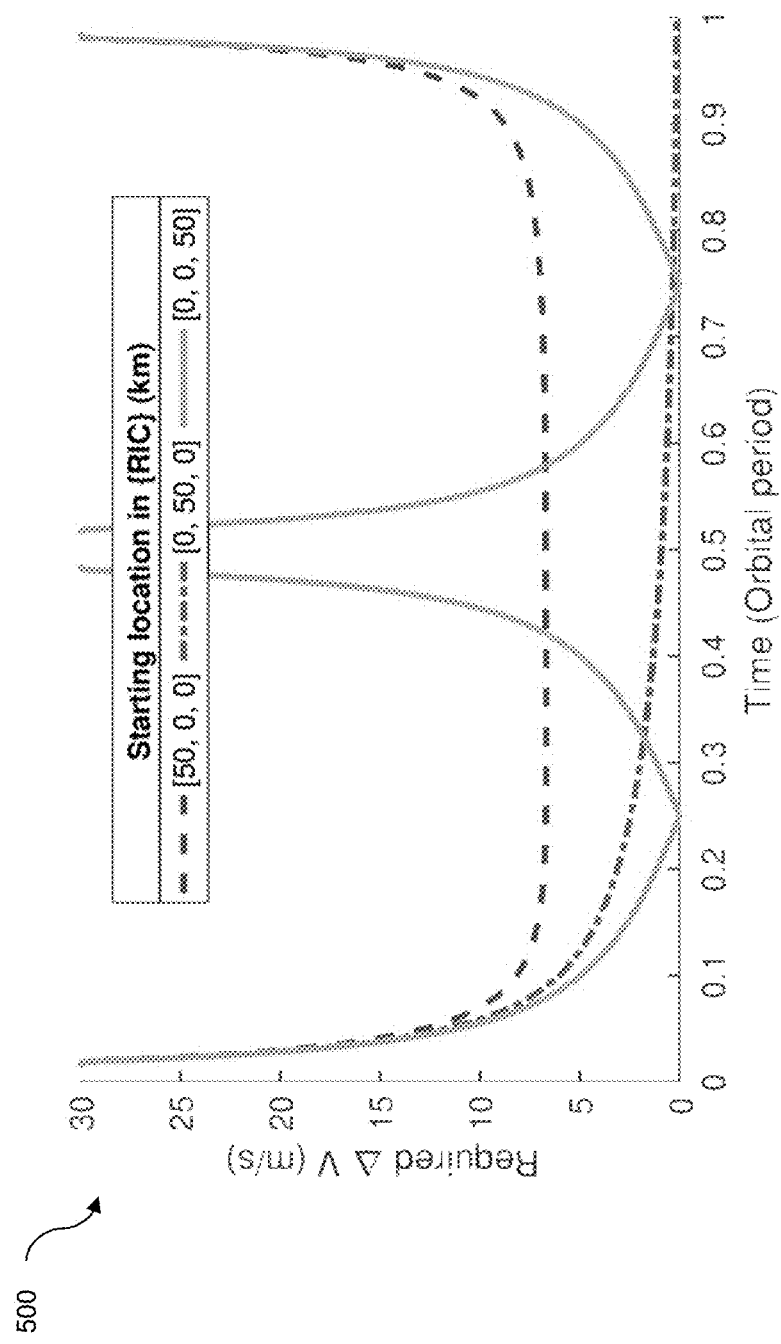
FIG. 5 is a graph showing a required (cyclic) level of effort (the impulse per unit of spacecraft mass), hereinafter referred to as the required change in velocity $\Delta V$, for a spacecraft to reach a point initially 50 km away in each direction.

Time en route is the second consideration of maneuver. The criticality of this parameter is dependent on outside factors. If there is a military or political need to accomplish a mission within a certain window, then time en route may be the deciding factor in maneuver planning. If there is some flexibility in the timing, then more efficient routes can be chosen to minimize fuel. The difficulty as measured by $\Delta V$ to reach a point varies based on the time to intercept and the plane in which the maneuver is occurring. FIG. 5 shows the difficulty for a spacecraft to reach a $\{0,0,0\}$ point initially 50 km away in any RIC direction.

Maneuvers in the cross-track plane are the most straightforward. Thrust applied in the cross-track direction results in an inclination change. Regardless of the magnitude of thrust imparted, the newly inclined orbit crosses the original orbit twice every orbital period, as the spacecraft transitions from positive cross-track displacement to negative displacement. The lowest cost intercept for an object that has existing cross-track separation is to simply wait for the orbits to cross naturally, which occurs within the next 0.5 periods. In FIG. 5, where the spacecraft begins 50 km cross-track from its target point ($\{0,0,0\}$) with no initial cross-track velocity (highest cross-track displacement), no thrust is required to intercept in 0.25 or 0.75 periods. Intercepting in 0.5 periods takes an exceptionally high amount of thrust as this would require circularizing the orbit completely.

If there is initially a radial separation between present and target location, there is a minimum amount of energy required to initiate an intercept (as depicted in FIG. 5). If the orbits naturally cross, the required $\Delta V$ is low as the only adjustments necessary are orbital phasing. If the orbits do not cross, sufficient energy must be input to adjust appropriately.

In-track maneuvers, where both spacecraft begin in the same circular maneuvers, are the least expensive (FIG. 5). It only takes a minor amount of thrust to enter an orbit slightly higher or lower to initiate a phasing maneuver to catch up to an objective point ($\{0,0,0\}$). The required $\Delta V$ is entirely dependent on the relative speed of the desired rendezvous; it can be any non-zero value provided the interceptor is willing to wait long enough to eventually intercept.

Terrestrial defense typically uses range-based exclusion and warning zones to identify incoming threats and develop an appropriate response. These are typically defined based on the range to the high-value asset and are spaced such that there is sufficient time to respond to the worst-case threat. Currently, most spacecraft do not have defensive weaponry and therefore are limited to evasive maneuvers in response to aggression. Ground-based units may be able to assist; however, orbital spacecraft are hours away from ground-launched assets. Diplomacy interactions take time as well. Ultimately, the triggering condition for evasive maneuver should be set such that the on-orbit asset is able to survive long enough to be rescued; either by the diplomatic process or by ground-launched interceptors. This required survival time could be estimated as one day or another specified survival time. The goal is to ensure the spacecraft has sufficient time to respond to an inbound threat.

Figure 6:
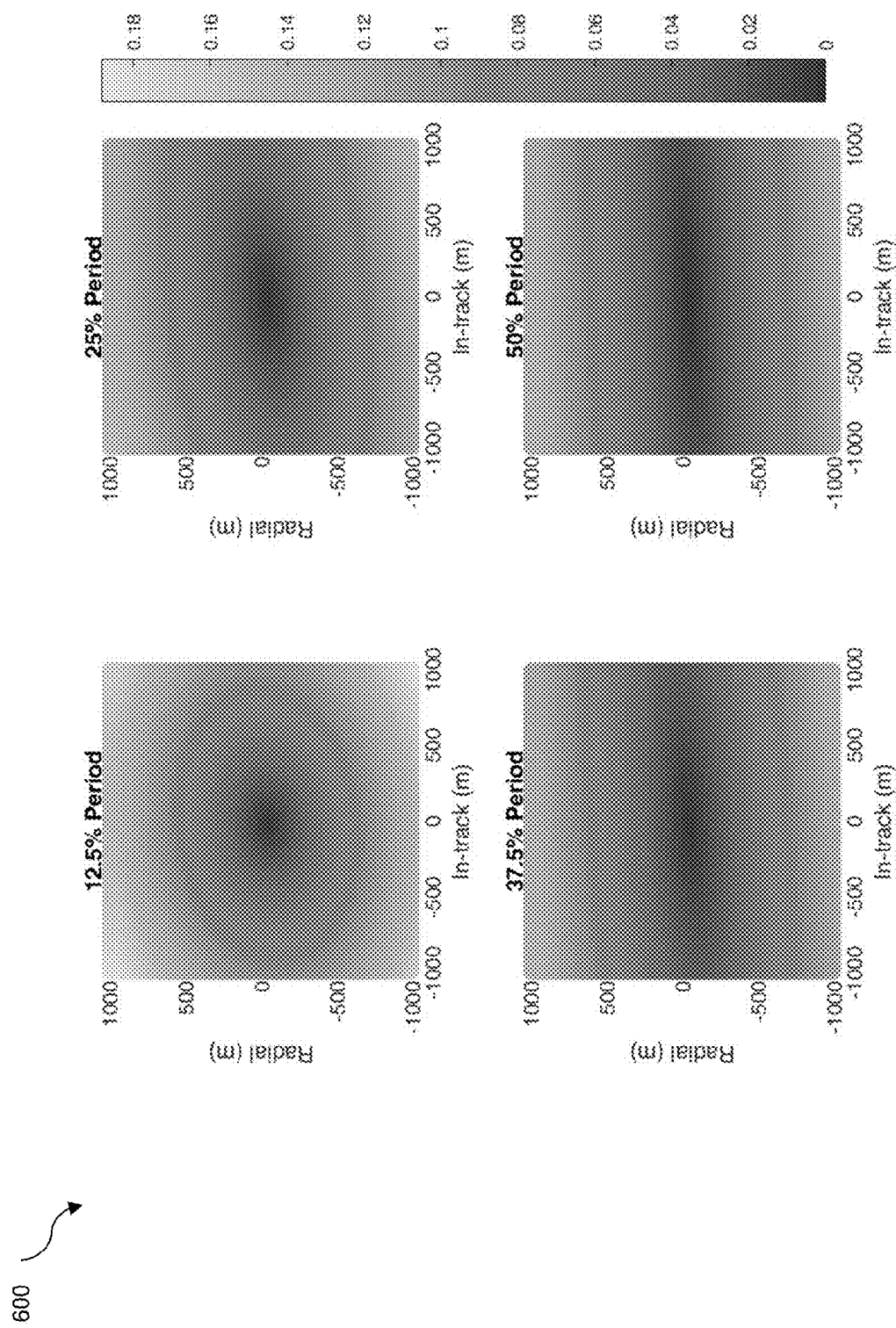
FIG. 6 shows contour plots of ease of reachability of a point when staring at a 0,0 location, within a fixed time measured as a fraction of a period of a spacecraft in a circular orbit.

Specifically, on-orbit, there is no direct correlation between range and difficulty of rendezvous. The contour plots of FIG. 6 show the required $\Delta V$ to reach points in RIC xy-plane relative to the starting location at 0,0 in a circular orbit with a variety of time steps. Blue (the lower color in the color bar) requires relatively low effort; yellow (the higher color) requires the most effort. As the available time increases, the difficulty to move to points in-track decreases. Note how for maneuvers in less than 12.5% period, the relative difficulty is very nearly purely range-based. As the available time increases, the difficulty to reach locations in the in-track direction decreases. Thus, the thrust duration $\Delta V$ to reach a point in space varies based on the time to intercept and the plane in which a maneuver is occurring.

Threats should be categorized based on the difficulty of rendezvous (the level of effort necessary for the aggressor) within a set time limit instead of just range, which provides a more accurate estimate of threat likelihood and affords the defending spacecraft the opportunity to react appropriately. If the level of effort required to complete an intercept drops below a certain threshold value, the defending spacecraft should begin evasive maneuvers. This initial required effort provides a maneuvering advantage for the evasion; the potential threat must both provide the effort to rendezvous with where the target was, and any additional movement generated by the target's maneuvers. If that value is assessed to be larger than a threshold value (perhaps driven by the magnitude of previous threat's maneuvers), the object won't be a threat in that time window. As one example, $\Delta V=5$ m/s can be used as such threshold value and the defensible threat time (time of intercept) four hours, although different threshold values and time parameters may be used.

Below are described embodiments in accordance with the invention that provide a system and method for automated intercept avoidance for spacecraft that utilize maneuver tactics as a means of avoiding a co-orbital threat to a spacecraft while minimizing the use of fuel by the spacecraft.

Figure 7:
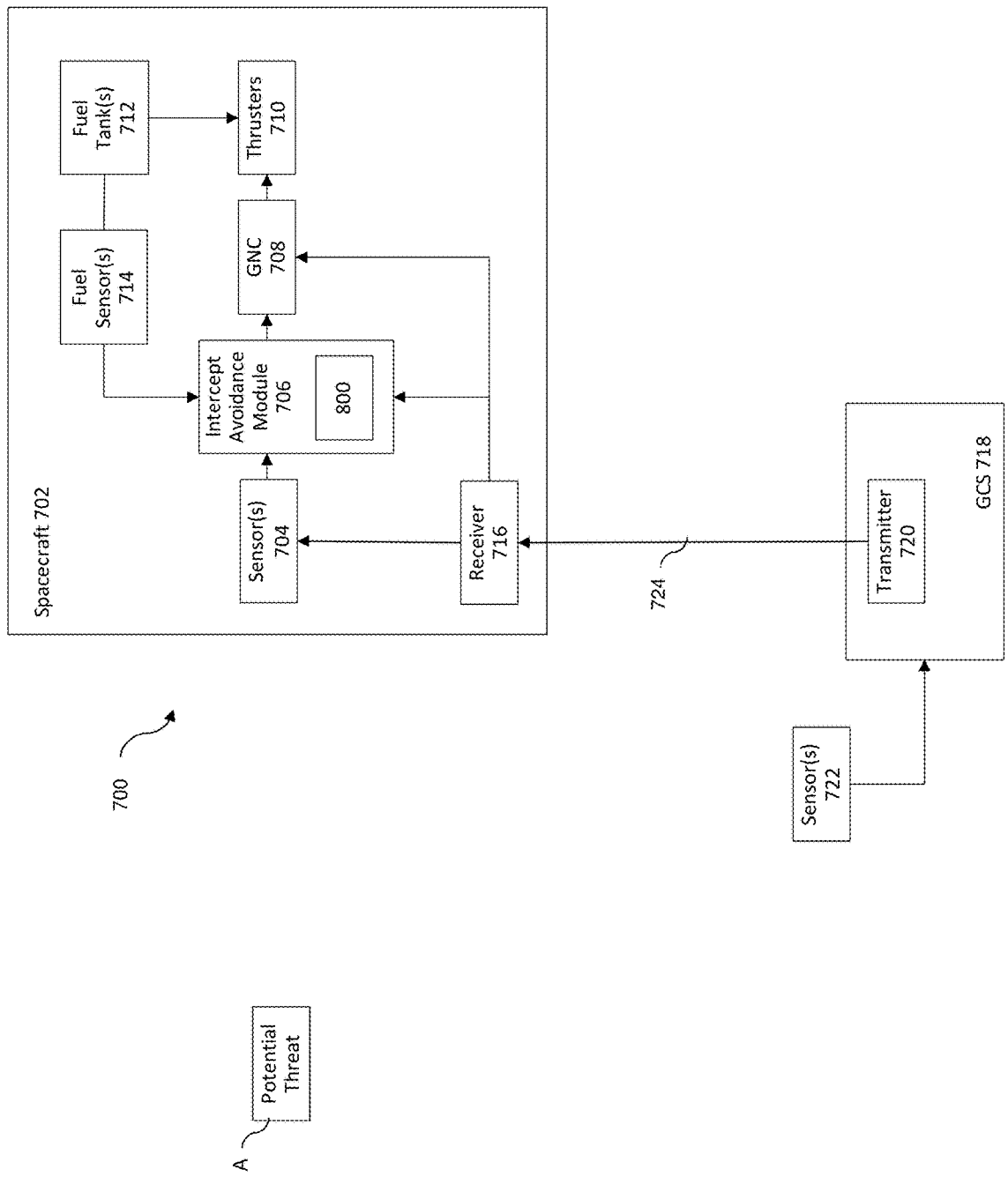
FIG. 7 is a schematic illustration of a system 700 for automated intercept avoidance for spacecraft in accordance with one embodiment of the invention.

FIG. 7 is a schematic illustration of a system 700 for automated intercept avoidance for spacecraft accordance with one embodiment of the invention. In FIG. 7 a spacecraft 702, such as a satellite, includes one or more onboard sensors 704 which autonomously monitor the area surrounding spacecraft 702 for potential threats, such as a foreign spacecraft (maneuvering satellite) A. For example, onboard sensors 704 can monitor the area surrounding spacecraft 702 within several hundreds of kilometers. Upon detection of a potential threat, for example, satellite A, one or more onboard sensors 704 communicate the detection information to an intercept avoidance module 706. Intercept avoidance module 706 includes a computer-implemented method for automated intercept avoidance for spacecraft 800 which receives the detection information, determines whether the detection is a potential threat, and if so, determines a corresponding evasion maneuver, and communicates the evasion maneuver to a guidance, navigation and control (GNC) module 708. GNC module 708 executes the received evasion maneuver by communicating firing commands to one or more onboard thrusters 710 which utilize fuel from one or more onboard fuel tank(s) 712 to affect the firing and put in motion the evasion maneuver by spacecraft 702.

In the present embodiment, intercept avoidance module 706 receives information on the current fuel level(s) in onboard fuel tank(s) 712, for example from fuel level sensor(s) 714 that monitor current fuel levels in onboard fuel tank(s) 712. In the present embodiment, a ground control station (GCS) 718 may assist spacecraft 702 in detecting threats and/or calculating evasion maneuvers by sending commands to spacecraft 702 via a network 724 which are received by an onboard receiver 716. For example, GCS 718 may send commands which direct onboard sensors 704 to focus detection resources on certain areas in space surrounding spacecraft 702, commands to initiate an evasion maneuver based on data received by GCS 718, and/or commands which provide direct control commands to GNC module 708 via transmitter 720. GCS 718 may further be connected to secondary sensors 722 which gather detections in the area of spacecraft 702 and may provide additional detection information to GCS 718. As GCS 718 only periodically "sees" spacecraft 702 during orbit, spacecraft 702 mostly relies on data received from its onboard sensors 704 for its position information and for detection of potential threats in space.

FIG. 8 is process flow diagram of a method for automated intercept avoidance for spacecraft 800 in accordance with one embodiment of the invention. Upon initiation of system 700, intercept avoidance module 706 including method 800 operates in stand-by or other wait mode until a potential threat is detected by sensor(s) 704 or sensor(s) 722, such as satellite A, and potential threat detection data associated with satellite A is communicated to intercept avoidance module 706. In one embodiment, the potential threat detection data includes information on the relative position and velocity of satellite A. For example, the potential threat data may include relative position, velocity, and directional information associated with satellite A (collectively referred to as satellite A pose).

In operation 802, the potential threat data is received by intercept avoidance module 706, and processing continues to operation 804. As earlier discussed, this data can come from onboard sensor(s) 706 or from secondary sensors 722 via GCS 718.

In operation 804, the relative (satellite A to spacecraft 702) coordinates of the potential threat and the components of its relative velocity are estimated in a specified coordinate frame, such as a RIC frame, with processing continuing to operation 806.

In operation 806 the required intercept time and change in velocity ΔV are calculated for satellite A which is a measure of the difficulty for satellite A to intercept spacecraft 702.

In the present embodiment, the transition time and change in velocity ΔV required by satellite A to intercept spacecraft 702 is calculated using the closed form matrix solution of the Clohessy-Wiltshire differential equations describing a simplified model of orbital relative motion (this solution is proven to be extremely accurate within at least the first orbital period). Assuming single-input orbit-transfer operations to move from point to point on a circular orbit, the calculations are carried out in three steps. First, the time required to transit between those two locations (the threat location in the RIC coordinates determined in operation 804 and a {0,0,0} point is determined. Second, the end state velocity is computed (propagated from the initial velocity vector of a threat determined in operation 804). Last, the necessary change in velocity ΔV is computed as a difference between the initial and end state velocity vectors. From operation 806, processing continues to decision operation 808.

In decision operation 808, a determination is made whether the change in velocity ΔV for satellite A calculated in operation 806 is lower than a specified threshold level of ΔV. For example, in one embodiment, a specified threshold level of ΔV can be ΔV=5 m/s, although this threshold level is exemplary only and other threshold levels may be used.

In the current embodiment, when the change in velocity ΔV calculated in operation 806 is not lower than the specified threshold level ΔV ("NO"), satellite A is determined not to be a threat, and processing returns and awaits a next potential threat detection 822 to initiate operation 802. Alternatively, when the change in velocity ΔV calculated in operation 806 is lower than the specified threshold level ΔV ("YES"), satellite A is determined to be a threat, and processing continues to decision operation 810.

In decision operation 810, a determination is made whether past evasion maneuvers were successful. At the very first update there are no "past" evasion maneuvers and therefore, the flow proceeds with decision operation 816, when either in-track or radial evasion pattern is chosen. However, after several update cycles, there is a history of whether these in-track or radial evasion maneuvers are in fact successful. If they fail to have a positive effect after 2% of the orbital period resulting in satellite A closing the distance to spacecraft 702, an emergency evasion pattern is selected as described further herein with reference to operation 812. When paired with prior maneuvers, this results in a radial and cross-track separation that are out of sequence and therefore requires satellite A to match the maneuver to ensure appropriate synchronization. In the current embodiment, upon a determination that past evasion maneuvers were successful ("YES"), processing flows to decision operation 816.

In decision operation 816, a determination is made whether the intercept time for satellite A to intercept satellite 702 determined in operation 804 is greater than 15% of the orbital period. Upon a determination that the intercept time is greater than 15% of the orbital period ("YES"), processing flows to operation 820.

In operation 820, when satellite A is tracking to intercept spacecraft 702 at a time greater that 15% of the orbital period, an in-track evasion pattern is selected in which in-track thrust is applied to produce a radial change over a long period, thereby increasing in-track separation between spacecraft 702 and satellite A. From operation 820 processing flows to operation 814 where the selected evasion pattern is output to GNC 708 with processing returning to operation 804.

Referring back again to decision operation 816, alternately, upon a determination that the intercept time is not greater than 15% of the orbital period ("NO"), processing flows to operation 818. In operation 818, when satellite A is tracking to intercept spacecraft 702 in a time less than 15% of the orbital period, a radial evasion pattern is selected in which radial thrust is instead applied. From operation 818 processing flows to operation 814 where the selected evasion pattern is output to GNC 708 with processing returning to operation 804.

Referring back again to decision operation 810, upon a determination that past evasion maneuvers were not successful ("NO"), processing continues to operation 812. In operation 812, an emergency evasion pattern is selected in which thruster(s) 710 fire in all three directions (R, I, and C). From operation 812 processing flows to operation 814 where the selected evasion maneuver is output to GNC 708 with processing returning to operation 804.

Simulations showed that applying the process flow of FIG. 8 results in a 100% evasion rate for equally matched spacecraft.

In one embodiment, intercept avoidance module 706 can be implemented as a computer system including: a central processing unit (CPU); an operating system; one or more input/output (I/O) interface(s); and a memory, including method for automated intercept avoidance for spacecraft 800. In various embodiments, I/O interfaces (s) may include device interfaces, as well as network interfaces, that allow the computer system to be communicatively coupled with external systems and devices and allow for inputting data to and outputting data from the computer system. Method for automated intercept avoidance for spacecraft 800 can be stored in the memory and executed on the computer system. In some embodiments, the computer system may be further coupled to a larger network (not shown). In some embodiments, method for automated intercept avoidance for spacecraft 800 can be fully or partially implemented on the computer system and on an external network. In one embodiment, method for automated intercept avoidance for spacecraft 800 can be embodied as a computer program product in a medium configured to store or transport computer readable code. Some examples of computer program products are CD-ROM discs, DVDs, ROM cards, and computer hard drives.

Embodiments in accordance with the invention address potential threats to the orbital infrastructure and particularly dangerous co-orbital threats through the use of a plurality of evasion maneuvers selected to prevent a rendezvous with a potential threat from occurring within a finite horizon. Since fuel conservation happens to play a major role in spacecraft survival, embodiments in accordance with the invention maintain separation from a potential threat while minimizing a defending spacecraft's fuel consumption. In simulated embodiments, use of method resulted in a defending spacecraft using 30-50% less fuel than the potential threat while still evading. Embodiments in accordance with the invention could be implemented on on-orbit assets to ensure their survivability in engagements by potential threats.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention.

What is claimed is:

1. A method for automated intercept avoidance for spacecraft comprising:
   receiving a detection of a potential threat from one or more sensors;
   calculating a relative position and position coordinates of the potential threat;
   calculating a time and a required change in velocity $\Delta V$ of the potential threat to intercept the spacecraft;
   determining if the change in velocity $\Delta V$ is greater than a specified intercept threshold level of $\Delta V$;
   upon a determination that the change in velocity $\Delta V$ is not greater than the specified intercept threshold level of $\Delta V$, determining if past evasion maneuvers were successful;
   upon a determination that past evasion maneuvers were not successful, selecting an emergency evasion pattern, outputting the emergency evasion pattern to a guidance, navigation and control (GNC) module of the spacecraft to implement the emergency evasion pattern, and implementing the emergency evasion pattern maneuver to avoid intercept of the spacecraft by the potential threat;
   alternatively, upon a determination that past evasion maneuvers were successful, determining whether a time to intercept by the potential threat is greater than 15% of the orbit of the spacecraft;
   upon a determination that a time to intercept is not greater than 15% of the orbit of the spacecraft, selecting a radial evasion pattern, outputting the radial evasion pattern to the GNC to implement the radial evasion pattern, and implementing the radial evasion pattern maneuver to avoid intercept of the spacecraft by the potential threat; and,
   alternatively, upon a determination that a time to intercept is greater than 15% of the orbit of the spacecraft, selecting an in-track evasion pattern, outputting the in-track evasion pattern to the GNC to implement the in-track evasion pattern, and implementing the in-track evasion pattern maneuver to avoid intercept of the spacecraft by the potential threat.

2. The method of claim 1 wherein calculating the change in velocity $\Delta V$ comprises:
   using a closed form matrix solution of the Clohessy-Wiltshire differential equations describing a simplified model of orbital relative motion in which it is assumed single-input orbit-transfer operations to move from point to point on a circular orbit, wherein first, the time required to transit between the threat location and the spacecraft in RIC coordinates is determined and a $\{0,0,0\}$ point is determined, next an end state velocity is computed, propagated from an initial velocity vector of the threat, and, then, the necessary change in velocity $\Delta V$ is computed as a difference between the initial and end state velocity vectors.

3. The method of claim 1 wherein determining if past evasion maneuvers were successful comprises:
   determining whether satellite A has a positive increase in closing distance to the spacecraft after 2% of the orbital period.

4. A non-transitory computer readable medium with computer-executable instructions for automated intercept avoidance for spacecraft, the computer readable medium having computer executable instructions for:
   receiving a detection of a potential threat from one or more sensors;
   calculating a relative position and position coordinates of the potential threat;
   calculating a time and a required change in velocity $\Delta V$ of the potential threat to intercept the spacecraft;
   determining if the change in velocity $\Delta V$ is greater than a specified intercept threshold level of $\Delta V$;
   upon a determination that the change in velocity $\Delta V$ is not greater than the specified intercept threshold level of $\Delta V$, determining if past evasion maneuvers were successful;
   upon a determination that past evasion maneuvers were not successful, selecting an emergency evasion pattern, outputting the emergency evasion pattern to a guidance, navigation and control (GNC) module of the spacecraft to implement the emergency evasion pattern, and implementing the emergency evasion pattern maneuver to avoid intercept of the spacecraft by the potential threat;
   alternatively, upon a determination that past evasion maneuvers were successful, determining whether a time to intercept by the potential threat is greater than 15% of the orbit of the spacecraft;

upon a determination that a time to intercept is not greater than 15% of the orbit of the spacecraft, selecting a radial evasion pattern, outputting the radial evasion pattern to the GNC to implement the radial evasion pattern, and implementing the radial evasion pattern maneuver to avoid intercept of the spacecraft by the potential threat; and, alternatively, upon a determination that a time to intercept is greater than 15% of the orbit of the spacecraft, selecting an in-track evasion pattern, outputting the in-track evasion pattern to the GNC to implement the in-track evasion pattern, and implementing the in-track evasion pattern maneuver to avoid intercept of the spacecraft by the potential threat.

5. The non-transitory computer readable medium of claim 4 wherein calculating the change in velocity $\Delta V$ comprises:
using a closed form matrix solution of the Clohessy-Wiltshire differential equations describing a simplified model of orbital relative motion in which it is assumed single-input orbit-transfer operations to move from point to point on a circular orbit, wherein first, the time required to transit between the threat location and the spacecraft in RIC coordinates is determined and a $\{0,0,0\}$ point is determined, next an end state velocity is computed, propagated from an initial velocity vector of the threat, and, then, the necessary change in velocity $\Delta V$ is computed as a difference between the initial and end state velocity vectors.

6. The non-transitory computer readable medium of claim 5 wherein determining if past evasion maneuvers were successful comprises:
determining whether satellite A has a positive increase in closing distance to the spacecraft after 2% of the orbital period.

* * * * *